United States Patent
Mattsson

(12) 
(10) Patent No.: US 6,963,980 B1
(45) Date of Patent: Nov. 8, 2005

(54) COMBINED HARDWARE AND SOFTWARE BASED ENCRYPTION OF DATABASES

(75) Inventor: Ulf Mattsson, Stamford, CT (US)

(73) Assignee: Protegrity Corporation, Grand Cayman (KY)

(*) Notice: Subject to any disclaimer, the term of this patent is extended or adjusted under 35 U.S.C. 154(b) by 900 days.

(21) Appl. No.: 09/712,941

(22) Filed: Nov. 16, 2000

(51) Int. Cl.[7] .................... G06F 11/30; G06F 12/14; H04L 9/32
(52) U.S. Cl. ...................... 713/194; 713/193
(58) Field of Search ............... 713/194, 193, 713/165, 166

(56) References Cited

U.S. PATENT DOCUMENTS 5,983,350 A * 11/1999 Minear et al. ............. 713/201

FOREIGN PATENT DOCUMENTS

WO    WO9749211    12/1997

OTHER PUBLICATIONS

Ulf Dahl, "Method and Apparatus fro Data Processing", WO 97/492211.*

* cited by examiner

*Primary Examiner*—Gilberto Barron, Jr.
*Assistant Examiner*—Grigory Gurshman
(74) *Attorney, Agent, or Firm*—Fish & Richardson P.C.

(57) ABSTRACT

A relational database system for encryption of individual data elements comprising a encryption devices of at least two different types, the types being tamper-proof hardware and software implemented. The encryption processes of the system are of at least two different security levels, differing in the type of encryption device holding the process keys for at least one of the process key categories and also differing in which type of device executing the algorithm of the process. Each data element to be protected is assigned an attribute indicating the usage of encryption process of a certain security level.

17 Claims, 1 Drawing Sheet

COMBINED HARDWARE AND SOFTWARE BASED ENCRYPTION OF DATABASES

FIELD OF INVENTION

The present invention relates to a method and system for encryption of data elements in a relational database.

BACKGROUND OF THE INVENTION

In order to protect information stored in a database, it is known to store sensitive data encrypted in the database. To access such encrypted data you have to decrypt it, which could only be done by knowing the encryption algorithm and the specific decryption key being used. The access to the decryption keys could be limited to certain users of the database system, and further, different users could be given different access rights.

Specifically, it is advantageous to use a so-called granular security solution for the encryption of databases, instead of building walls around servers or hard drives. In such a solution, which is described in the document WO 97/49211 by the same applicant, a protective layer of encryption is provided around specific sensitive data-items or objects. This prevents outside attacks as well as infiltration from within the server itself. This also allows the system administrator to define which data stored in databases are sensitive and thereby focusing the protection only on the sensitive data, which in turn minimizes the delays or burdens on the system that may occur from other bulk encryption methods.

Most preferably the encryption is made on such a basic level as in the column level of the databases. Encryption of whole files, tables or databases is not so granular, and does thus encrypt even non-sensitive data. It is further possible to assign different encryption keys of the same encryption algorithm to different data columns. With multiple keys in place, intruders are prevented from gaining full access to any database since a different key could protect each column of encrypted data.

In present systems for such granular protection of data, the encryption process is performed within hardware. Using a tamper-proof hardware for protection of the algorithms and the keys results in a strong protection. One purpose of such a system is to provide data elements with different degrees of protection. However, when encrypting small blocks of data, such as individual data records in a database, a hardware encryption device could experience performance problems. Thus, even though granular encryption techniques on data elements in databases provides flexibility on the encryption level, this flexibility is not sufficient for commercial purposes. For example, in a application with increasing amounts of data and/or data processing, it could be of interest to significantly reduce the security level when encrypting for example older data, while maintaining a higher security level when encrypting new data. This would result in increased overall performance. The current solutions do not provide a sufficient flexibility, which forces the operator to invest in additional hardware resources in order to maintain the systems overall performance. Current hardware encryption systems utilizes a tamper-proof hardware device for encrypting the data elements. The hardware device's processing capability is dependent on the device's processor, memory, architecture, etc. The only way, without changing the device's hardware configuration, to increase a system's performance utilizing such a device, is to use simpler encryption algorithms, for instance reduce the key length etc. However, the reduction of encryption security level reaches a level where the used processing power does not decrease proportionally, since the initial overhead for each access to the tamper-proof hardware will still be constant. Therefore, such systems experience a performance problem when faced to increased load and when encryption of data elements requiring lower protection increases.

OBJECT OF THE INVENTION

It is therefore an object of the present invention to provide a method and a system for improving the flexibility and improve the overall performance in encrypting data in a database overcoming the above mentioned problems.

The object is achieved by a method and a system according to the appended claims.

SUMMARY OF THE INVENTION

According to the invention a relational database system for encryption of individual data elements comprises a plurality of encryption devices being of at least two different types, the types being tamper-proof hardware and software implemented, said encryption being provided by different encryption processes utilizing at least one process key in each of the categories master keys, key encryption keys, and data encryption keys, said process keys of different categories being held in said encryption devices;

wherein said encryption processes are of at least two different security levels, where a process of a higher security level utilizes said tamper-proof hardware device to a higher degree than a process of a lower security level;

wherein each data element which is to be protected is assigned an attribute indicating the level of encryption needed, said encryption level corresponding to an encryption process of a certain security level.

Hereby, a system is provided, which overcomes the above mentioned problems. With such a system it becomes possible to combine the benefits from hardware and software based encryption. The tamper-proof hardware device could for example be a device with a security level 4 as described in the Federal Information Processing Standard (FIPS) Publication 140-1 developed by the National Institute of Standards and Technology (NIST) or any equivalent, said publication hereby included by reference. The software implemented device could be any data processing and storage device, such as a personal computer. The tamper-proof hardware device provides strong encryption without exposing any of the keys outside the device, but lacks the performance needed in some applications. On the other hand the software implemented device provides higher performance in executing the encryption algorithms, but exposes the keys resulting in a lower level of security. The present invention takes advantage of the fact that all data elements in a database do not need the same level of encryption.

With such a system it becomes possible to rapidly change the system's security levels and performance, respectively. For example, when an attack is detected, it will be possible to easily raise the security levels for a selection of data elements. In another situation, for instance in an electronic commerce system, the performance for a part of the online store could swiftly be increased by changing the security level of a selection of data elements.

In a preferred embodiment a process of a first higher security level essentially utilizes said tamper-proof hardware device and a process of a second lower security level essentially utilizes said software implemented device.

Preferably, the encryption processes differ in the type of encryption device holding the process keys for at least one of the process key categories and also in which type of device executing the algorithm of the process. However, this is only one way of configuring such a system.

Preferably, said system comprises:

an encryption process of a first security level having said tamper-proof hardware device for holding the process keys for the process key categories master keys, key encryption keys, and data encryption keys, and said tamper-proof hardware device for executing the encryption algorithm of said first security level process; and an encryption process of a second security level having said tamper-proof hardware device for holding the process keys for the process key categories master keys and key encryption keys, and said software implemented device for holding the at least one process key of the process key category data encryption keys, and said software implemented device for executing the encryption algorithm of said second security level process.

The first encryption process should then be used for the most sensitive data. The second encryption process utilizes both the tamper-proof hardware device and the software implemented device in order to encrypt data. The tamper-proof hardware device holds all but the data encryption keys, which are checked-out from the tamper-proof hardware device. Thus, the tamper-proof hardware device holds the master key and the key encryption keys are not exposed outside the hardware device. The data processing and storage device now use the checked-out data encryption key for encryption of a data element.

Encryption by the software implemented device is most advantageous for small blocks of data. Preferably the attributes for short data blocks, 8–16 bytes of data, are automatically set to use said second encryption algorithm.

In another embodiment, the system comprises a third security level having said software implemented device for holding the process keys for the process key categories master keys, key encryption keys, and data encryption keys, and said software implemented device for executing the encryption algorithm of said third security level process. Using a third encryption process for some data elements could even further improve the performance of the system, since it probably will reduce the load on the tamper-proof hardware device.

Preferably the attributes also comprises information about initialization vectors and length of the encryption key.

In one embodiment the system further comprises a key caching feature. This is useful when a large number of different keys are used on short blocks in order to increase the performance of the system. For example, the key is cached the first time it is decrypted and used inside the tamper-proof hardware device.

Also according to the invention a method for encryption of individual data elements in relational database system, wherein said system comprises a plurality of encryption devices being of at least two different types, the types being tamper-proof hardware and software implemented, comprises the steps of:

providing encryption processes of at least two different security levels, where a process of a first higher security level essentially utilizes said tamper-proof hardware device and a process of a second lower security level essentially utilizes said software implemented device;

assigning an data element which is to be protected an attribute indicating the level of encryption needed, said encryption level corresponding to an encryption process of a certain security level;

choosing an encryption process correlating to the security level assigned to said data element which is to be protected;

encrypting, using chosen encryption process, said data element which is to be protected.

Hereby, a method is provided, which overcomes the above mentioned problems. With such a method it becomes possible to combine the benefits from hardware and software based encryption.

BRIEF DESCRIPTION OF THE DRAWING

For exemplifying purposes, the invention will be described to embodiments thereof illustrated in the attached drawing, wherein.

DESCRIPTION OF THE PREFERRED EMBODIMENTS

Figure 1:
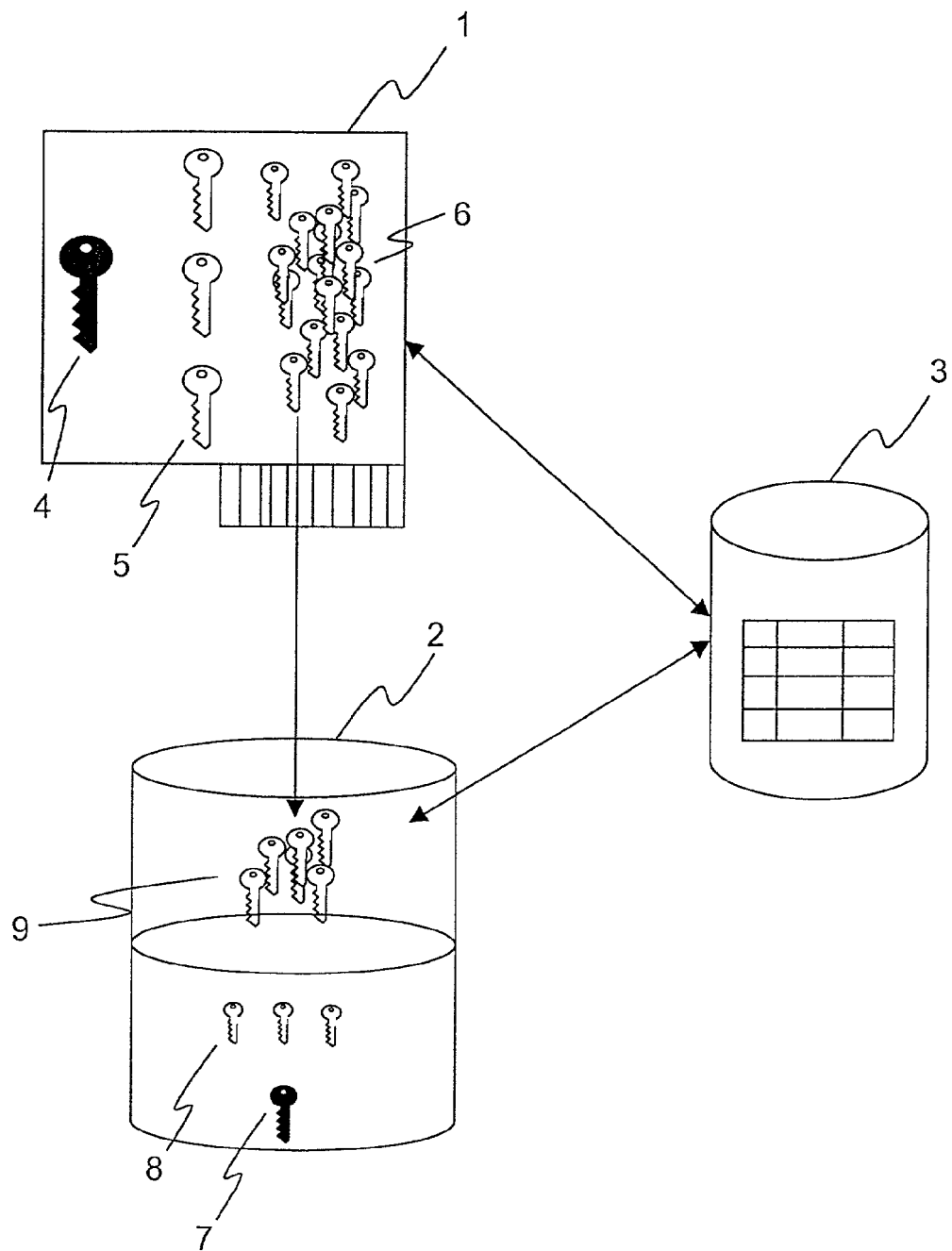
FIG. 1 is a schematic view of a system according to the invention.

Referring to FIG. 1, a schematic view of a system according to an embodiment of the invention is illustrated. The system comprises a tamper-proof hardware device 1, a software implemented device 2, which are used for encrypting data elements in a relational database 3. The software implemented device is as previously described any data processing and storage device. The term software implemented is to be understood an opposite to the tamper-proof hardware device. For example, the software implemented device could be a traditional personal computer, having a microprocessor for executing the algorithms and where the different keys and algorithms are stored on a storage media connected thereto, such as a hard disk. The storage media could be organized as a relational database with a database management system, and the keys stored in said database. Upon request from the system, according to the invention, said keys and algorithms would then be read from the storage media into the working area of a random access memory. There, the microprocessor of the software implemented device would process a data element of the relational database 3 in order to obtain an encrypted data element.

The tamper-proof hardware device 1 holds a master key 4, key encryption keys 5 and data encryption keys 6. The tamper-proof hardware device 1 has mechanisms for executing encryption algorithms. As an example, and not limited to, the tamper-proof hardware could be a multi-chip embedded module, packaged in a PCI-card. In addition to cryptographic hardware, and circuitry for tamper detection and response, it could include a general-purpose computing environment: a 486-class CPU (99 Mhz in Model 2), executing software stored in ROM and in FLASH. The multiple-layer software architecture preferably comprises foundational security control (Layer A and Layer B), supervisor-level system software (Layer C), and user-level application software (Layer D). The Layer C component is designed to support application development. Within Layer C, a kernel provides standard OS abstractions of multiple tasks and multiple address spaces. Then the software implemented device is a multiple-layer software architecture comprising foundational security control (Layer A and Layer B), basic crypto functions software (Layer C), and user-level application software (Layer D).

The software implemented device 2 also holds another set of keys; one software master key 7, software key encryption keys 8 and software data encryption keys 9. By software keys 7, 8 and 9 are meant keys stored in the software implemented device 2.

The relational database system 2 comprises data elements organized in tables with rows and columns. Each data element have an attribute, which describes the security level of the data element, for example in a scale from A–C. The security level could then represent different encryption processes, and preferably further information about the encryption process. Such information could comprise where the keys are stored, which encryption algorithms to use, where to execute the algorithm, key values, key length or an initialization vector, etc. An example of an algorithm that could be used for an encryption process is DES with ECB, in CBC mode with rotating IV. The processes according to the embodiment differ in their security level. An example of the implementation of respective encryption process security levels are given in table 1 below.

TABLE 1

Example of security levels

|  | Security level A | Security level B | Security level C |
| --- | --- | --- | --- |
| Storage of master key | H/W | H/W | S/W |
| Storage of key encryption keys | H/W | H/W | S/W |
| Storage of data encryption keys | H/W | S/W | S/W |
| Execution of encryption algorithm | H/W | S/W | S/W |

According to table 1, a data element having an attribute stating security level A, will have the strongest protection. Then, none of the keys will be exposed outside the tamper-proof hardware 1 and the encryption process will take place within the tamper-proof hardware 1. A data element with security level B, will check-out (preferably by decrypting and exporting), a data encryption key 6 from the tamper-proof hardware 1 to the software implemented device 2 and use it a software encryption key 9. This data encryption key 9 will then be used by an encryption algorithm processed in the software implemented device 2 described above. After processing the data encryption key 9 will be stored in the software implemented device 2 for later decryption. Finally, data elements requiring a not so strong protection will have the attribute security level C. This means that they all the keys involved the crypto-process are stored in the software implemented device 2, where also the encryption process takes place.

The invention has been described above in terms of a preferred embodiment. However, the scope of this invention should not be limited by this embodiment, and alternative embodiments of the invention are feasible, as should be appreciated by a person skilled in the art. For example, the software keys 7, 8 and 9 could be stored in the same database as the data elements that are subject for encryption.

Such embodiments should be considered to be within the scope of the invention, as it is defined by the appended claims.

What is claimed is:

1. A relational database system for encryption of individual data elements from a relational database, said relational database system comprising
   a plurality of encryption devices being of at least two different types, the types being tamper-proof hardware and software implemented,
   said encryption being provided by different encryption processes utilizing at least one process key in each of the categories master keys, key encryption keys, and data encryption keys, said process keys of different categories being held in said encryption devices;
   wherein said encryption processes are of at least two different security levels, where a process of a higher security level has greater access to said tamper-proof hardware device than a process of a lower security level;
   wherein each data element which is to be protected is assigned an attribute indicating an encryption level, said encryption level corresponding to an encryption process of a certain security level.

2. A relational database system according to claim 1, wherein where a process of a first higher security level essentially utilizes said tamper-proof hardware device and a process of a second lower security level essentially utilizes said software implemented device.

3. A relational database system according to claim 1, wherein said encryption processes of at least two different security levels differ in the type of encryption device holding the process keys for at least one of the process key categories and also in which type of device executing the algorithm of the process.

4. A relational database system according to claim 1, comprising:
   an encryption process of a first security level having said tamper-proof hardware device for holding the process keys for the process key categories master keys, key encryption keys, and data encryption keys, and said tamper-proof hardware device for executing the encryption algorithm of said first security level process; and
   an encryption process of a second security level having said tamper-proof hardware device for holding the process keys for the process key categories master keys and key encryption keys, and said software implemented device for holding the at least one process key of the process key category data encryption keys, and said software implemented device for executing the encryption algorithm of said second security level process.

5. A relational database system according to claim 1, wherein said attributes are, for short data blocks, 8–16 bytes of data, automatically set to use said second security level encryption process.

6. A relational database system according to claim 1, comprising:
   an encryption process of a third security level having said software implemented device for holding the process keys for the process key categories master keys, key encryption keys, and data encryption keys, and said software implemented device for executing the encryption algorithm of said third security level process.

7. A relational database system according to claim 1, wherein said attributes also comprises information about initialization vectors and length of the encryption key.

8. A relational database system according to claim 1, further comprising a key caching feature.

9. A relational database system according to claim 1, comprising:
- an encryption process of a first security level having said tamper-proof hardware device for holding the process keys for the process key categories master keys, key encryption keys, and data encryption keys, and said tamper-proof hardware device for executing the encryption algorithm of said first security level process;
- an encryption process of a second security level having said tamper-proof hardware device for holding the process keys for the process key categories master keys and key encryption keys, and said software implemented device for holding the at least one process key of the process key category data encryption keys, and said software implemented device for executing the encryption algorithm of said second security level process; and
- an encryption process of a third security level having said software implemented device for holding the process keys for the process key categories mater keys, key encryption keys, and data encryption keys, and said software implemented device for executing the encryption algorithm of said third security level process.

10. A method for encryption of individual data elements in relational database system, wherein said system comprises a plurality of encryption devices being of at least two different types, the types being tamper-proof hardware and software implemented, comprising the steps of:
- providing encryption processes of at least two different security levels, where a process of a higher security level has greater access to said tamper-proof hardware device than a process of a lower security level;
- assigning an data element which is to be protected an attribute indicating an encryption level, said encryption level corresponding to an encryption process of a certain security level;
- choosing an encryption process correlating to the security level assigned to said data element which is to be protected;
- encrypting, using chosen encryption process, said data element which is to be protected.

11. A relational database system for encrypting individual data elements from a relational database, the relational database system comprising:
- a tamper-proof hardware encryption device holding a first key set;
- a software-implemented encryption device holding a second key set;
- each of the key sets including a master key, a data-encryption key, and a key-encryption key
- the database system being configured to
  - assign a security level to a particular data element;
  - on the basis of the assigned security level, select, from a group of encryption processes, a particular encryption process to be used to encrypt the particular data element, the group including at least a higher-security encryption process and a lower-security encryption process,
  - wherein the higher-security encryption process uses a first key combination, and the lower-security encryption process uses a second key combination that differs from the first key combination, each of the first and second key combinations including
    - a master key selected from among the master keys of the first and second key sets,
    - a key-encryption key selected from among the key encryption keys of the first and second key sets, and
    - a data-encryption key selected from the data encryption keys of the first and second key sets,
  - wherein the number of keys in the first key combination that are selected from the first key set is greater than the number of keys in the second key combination that are selected from the first key set.

12. A relational database system according to claim 11, wherein the keys in the first key combination are selected from among the keys of the first key set.

13. A relational database system according to claim 11, wherein the keys in the second key combination are selected from among the keys of the second key set.

14. A relational database system according to claim 11, wherein the selection of a particular encryption process to be used to encrypt the particular data element further comprises selection of the lower-security encryption process when the particular data element consists of fewer than sixteen bytes of data.

15. A relational database system according to claim 11, wherein the group of encryption processes further includes a medium-security encryption process, and
- wherein the medium-security encryption process uses a third key combination that differs from the first and second key combination,
- wherein the third key combination includes
  - a master key selected from among the master keys of the first and second key sets,
  - a key-encryption key selected from among the key encryption keys of the first and second key sets, and
  - a data-encryption key selected from the data encryption keys of the first and second key sets,
- wherein the number of keys in the first key combination that are selected from the first key set is greater than the number of keys in the third key combination that are selected from the first key set, and
- wherein the number of keys in the third key combination that are selected from the first key set is greater than the number of keys in the second key combination that are selected from the first key set.

16. A relational database system according to claim 11, wherein the selection of a particular encryption process utilizes information about initialization vectors and length of the encryption keys associated with each encryption process in the group of encryption processes.

17. A relational database system according to claim 11, further comprising a key caching feature.

* * * * *